US012786205B1

(12) United States Patent
Sharo

(10) Patent No.: US 12,786,205 B1
(45) Date of Patent: Nov. 3, 2026

(54) PACKET ROUTE SELECTION USING SECURITY OF SERVICE METRICS

(71) Applicant: THE UNITED STATES OF AMERICA AS REPRESENTED BY THE SECRETARY OF THE NAVY, San Diego, CA (US)

(72) Inventor: Randall Sharo, Hanahan, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 3264 days.

(21) Appl. No.: 15/258,765

(22) Filed: Sep. 7, 2016

(51) Int. Cl.
*H04L 9/40* (2022.01)
*H04L 45/02* (2022.01)

(52) U.S. Cl.
CPC .......... *H04L 63/1416* (2013.01); *H04L 45/04* (2013.01); *H04L 63/0428* (2013.01); *H04L 63/1433* (2013.01); *H04L 63/1441* (2013.01)

(58) Field of Classification Search
CPC . H04L 63/1416; H04L 45/04; H04L 63/0428; H04L 63/1433; H04L 63/1441
See application file for complete search history.

(56) References Cited

U.S. PATENT DOCUMENTS 8,458,462 B1 * 6/2013 Hanna .................... H04L 63/10 726/10
9,077,694 B2 * 7/2015 Larson ................ H04L 63/0485
2010/0281539 A1 * 11/2010 Burns ................. H04L 63/1441 726/13

FOREIGN PATENT DOCUMENTS

CN 103200103 A * 7/2013
CN 104901885 A * 9/2015 ............. H04L 47/23
CN 105376160 A * 3/2016 ............. H04L 47/24
CN 107251509 A * 10/2017 ........... H04L 45/033
RU 2472217 C1 * 1/2013

OTHER PUBLICATIONS

Translation of CN104901885 (Year: 2015).*
Xiaofeng Lu, "Minimizing detection probability routing in ad hoc networks using directional antennas," EURASIP J. Wirel. Commun. Netw., pp. 3:1-3:8, Jun. 2009.
Jafar Haadi Jafarian, "Formal Approach for Route Agility against Persistent Attackers," ESORICS, Lecture Notes in Computer Science, vol. 8134, pp. 237-254, 2013.

(Continued)

*Primary Examiner* — Daniel Pihulic
(74) *Attorney, Agent, or Firm* — Naval Information Warfare Center Pacific; Ryan J. Friedl; Kyle Eppele

(57) ABSTRACT

A method involves numerically characterizing the security of each of more than one routes from a first location to a second location in a communications network and transmitting at least one packet along one or more routes of the communications network having a desired numerical characterization. The numerical characterization may include determining an aggregate packet detection metric and/or an aggregate packet interception metric as a mathematical function of the determined packet detection metrics for each node along the prospective route. The desired numerical characterization may be a lowest aggregate packet detection metric and/or aggregate packet interception metric, or packet detection and/or packet interception metrics that exceed a predetermined threshold.

14 Claims, 5 Drawing Sheets

(56) References Cited

OTHER PUBLICATIONS

Kuipers, F. et al., "An Overview of Constraint-based Path Selection Algorithms for QoS Routing", IEEE Communications Magazine, pp. 50-55, Dec. 2002.
Open Networking Foundation (ONF), "Software-Defined Networking: The New Norm for Networks," 2012.
S. Scott-Hayward, G. O'Callaghan and S. Sezer, "Sdn Security: A Survey," in Future Networks and Services (SDN4FNS), 2013 IEEE Sdn for , vol. No., pp. 1,7, Nov. 11-13, 2013, 2013.
R. Gesa, Congestion probability routing in virtual path ATM networks, Universitat de Girona, 1998, available online at http://www.tdx.cat/handle/10803/31897.
Bohacek, S., et al., "Enhancing Security Via Stochastic Routing", Proceedings of IEEE Computers Communications and Networks, pp. 58-62, 2002.
Bohacek, S., et al., "Saddle Policies for Secure Routing in Communications Networks", Proceedings of 41st IEEE Conference on Decision and Control, pp. 1416-1421, Las Vegas, NV, 2002.
Bohacek, S., et al., " Game Theoretic Stochastic Routing for Fault Tolerance and Security in Computer Networks", IEEE Transactions on Parallel and Distributed Systems, vol. 18, issue 9, pp. 1227-1240, 2007.
Paris, S., et al., "EFW: A Cross-Layer Metric for Reliable Routing in Wireless Mesh Networks with Selfish Participants", IEEE/ACT Transactions on Networking, vol. 21, issue 9, pp. 1003-1016, 2013.

* cited by examiner

PACKET ROUTE SELECTION USING SECURITY OF SERVICE METRICS

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Atlantic, Code 70F00, North Charleston, SC, 29419-9022; voice (843) 218-3495; email ssc_lant_T2@navy.mil; reference Navy Case Number 103871.

BACKGROUND

End users of a computer network rely upon their network provider to carry traffic to and from remote sites on the network. If a router on that network has been compromised, an end user's data may be captured in transit, filtered for the purpose of identity matching, and/or decoded for malicious purposes. Encryption is the most common method used to address this problem. However, several problems are encountered when using encryption to protect data networks. For example, collection of large numbers of packets leads to vulnerability to cryptanalysis. Also, trusted intermediaries cannot inspect packets to detect data exfiltration (theft) without receiving keys. Further, encryption can require significant computing resources, especially for high-speed networks. An improved method is needed to minimize the likelihood that data sent across a network will be compromised.

DETAILED DESCRIPTION OF SOME EMBODIMENTS

Figure 1:
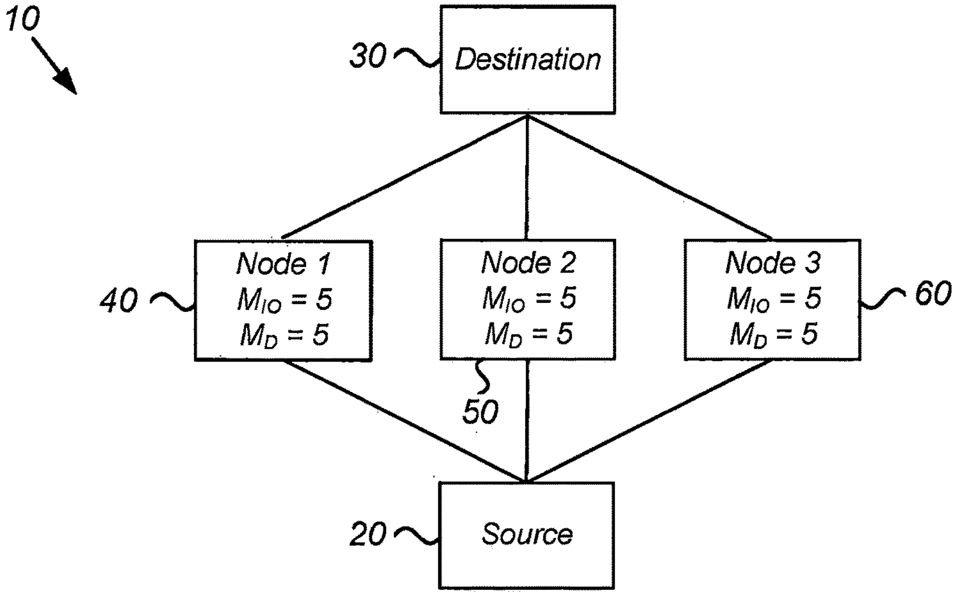
FIG. 1 shows a diagram illustrating a simple network topology.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments relate to a method that minimizes the likelihood that data sent across a network will be compromised. In some embodiments, the method computes statistics on the likelihood of data detection and data interception and then chooses routes for the data that constrain those statistics. The embodiments involve formulating security-of-service (SoS) metrics that express probability of interception and probability of detection in a computationally efficient form. The metrics directly translate to a percentage chance of session compromise by an adversary.

In some embodiments, a-priori topology and intrusion information may be used to compute metrics on a packet-by-packet basis. Metrics can be combined to compute aggregate probabilities for network data sessions. In some embodiments, the generation of SoS metrics may be automated based on topology and intrusion detection system inputs. In some embodiments, SoS metrics may be applied to multicast traffic through the use, for example, of Constrained Steiner Tree algorithms.

Probabilistic route selection algorithms previously have been formulated to minimize detection probabilities in wireless networks. Game-theoretic approaches have also been taken to mutate network routes in an attempt to minimize vulnerability to Denial of Service (DoS). Algorithms such as these are often driven by probabilities presented a-priori, with complex floating-point mathematical operations to derive a solution. If techniques are available to reduce probability measures to simple mathematical operations on integral values, then such algorithms may be executed on lower-cost hardware, and with greater update intervals.

SoS metrics are measures that aid a network in security-related decision-making. Much in the same way that Quality of Service (QoS) metrics address a user's performance demands on a network, SoS metrics quantify a user's security demands. Since the highest-performance traffic path on a network may not be the most secure traffic path, many cases are expected to arise where QoS demands and SoS demands are in conflict.

Like QoS metrics, SoS metrics may take on different values and thresholds depending on the nature of the data in transit. One may desire greater security assurances when accessing personal data, for example, than when browsing online media sites. Software Defined Networking (SDN) has made it possible to inject intelligent, application-specific routing behavior into commodity switches and routers. Integrating SDN routing with inputs from Intrusion Detection Systems (IDS) is an area of increasing interest, but effective means must be available to characterize IDS input for use in a routing algorithm.

The disclosed embodiments relate to numerical techniques to format and process IDS information as an aid in avoiding data theft or compromise. By mapping intrusion information into a packet detection and packet interception probability, such as at network routing nodes, techniques are described to build aggregate probabilities for user data sessions even as routes change over time. Routing algorithms may then be implemented to choose the most secure (minimum SoS metric) routes, or to choose QoS-optimal routes subject to SoS metric constraints.

Target identification is a precursor to many forms of network exploitation. Quantifying the probability of target identification is one step in assessing the overall security of service afforded to a user's session. A Detection Metric ($M_D$) is proposed to aid in the estimation of target identification probability.

Given a packet k relayed through node r, define $P_D[r,k]$ as the probability that an eavesdropper will identify the packet as a member of a Session of Interest (SoI) as it passes through node r. The Detection Metric $M_D[r,k]$ is then defined as:

$$M_D[r, k] \overset{def}{=} -G \ln(1 - P_D[r, k]) \tag{1}$$

$$0 \le M_D[r, k] < \infty \tag{2}$$

The variable G is a gain factor. Using $G=10^4$ produces a metric suitable for expression as a 16-bit integer, while $G=10^9$ provides better resolution when the metric is processed as a 32-bit integer. However, it should be recognized by a person having ordinary skill in the art that other values of G may be utilized depending upon the bit size of the integer, with an increasing G value used for an increasing bit size integer.

Let $R_k$ be the ordered list of nodes through which packet k passes. If probability of detection at each node along $R_k$ is statistically independent, then the packet's aggregate detection metric is the sum of the detection metrics at each node along the route:

$$M_D[k] = \sum_{r \in R_k} M_D[r, k] \tag{3}$$

Let S be the set of all packets that constitute a session. If the detection of any single packet in a session is taken to detect the entire session, and if all packet detection opportunities are taken to be statistically independent, then the detection metric for the session is as follows:

$$M_D[S] = \sum_{k \in S} \sum_{r \in R_k} M_D[r, k] \tag{4}$$

Table 1 below shows a probability of detection along with the associated computed 16-bit detection metric values, for a value of $G=10^4$.

TABLE 1

| Probability of Detection $P_D$) | Detection Metric $M_D$ | Notes |
|---|---|---|
| 0% | 0 | |
| 0.01% | 1 | Minimum Resolution |
| 1% | 101 | |
| 10% | 1054 | |
| 25% | 2877 | |
| 50% | 6931 | |
| 90% | 23026 | |
| 96.2247% | 32767 | $(2^{15}-1)$ |
| 99% | 46052 | |
| 99.8575% | 65535 | $(2^{16}-1)$ |
| 100% | $\infty$ | |

As a primary step in characterizing communication sessions, an eavesdropper must be able to identify the packets that constitute a Session of Interest (SoI). Traffic may be profiled based on several properties, to include source address, destination address, content, format, and volume. Detection of a session of interest might be influenced by the properties such as packet transmission rate, packet transmission volume, intermittency of packet transmission, number of sessions carried by a common channel, completeness of session information carried by a single channel, and consistency of packet format.

Many factors have bearing on computation of a Probability of Detection ($P_D$), and precisely characterizing the $P_D$ for a given packet passed through a given node is beyond the scope of the current effort. However, it is useful to consider how routing decisions and packet transformations impact an attacker's ability to detect a session.

Suppose that a packet k traverses nodes in the ordered list $R_k$ to its destination. Define the probability that packet k is detected while traversing node $r \in R_k$ as $0 \le P_D[r,k] \le 1$. If we take the set of detection probabilities to be statistically independent across nodes, then the probability that a packet is detected at least once along its route of travel is:

$$P_D[k] = 1 - \prod_{r \in R_k} (1 - P_D[r, k]) \tag{5}$$

Rearranging terms and taking the logarithm of both sides of the equation yields:

$$\ln(1 - P_D[k]) = \sum_{r \in R_k} \ln(1 - P_D[r, k]) \tag{6}$$

The relation in equation (6) contains the information necessary to make routing decisions based on known detection probabilities, but still requires floating point arithmetic to evaluate. By definition, probabilities fall within the range [0, 1]. Logarithms of probabilities therefore span the range (−∞, 0]. Scaling by a factor of $-10^4$ allows the metric to capture probabilities in the range from 0.01% to 99.8575% using metric values 1 through 65535 (see Table 1). Using the proposed scalar adjustment, we define the Detection Metric ($M_D$) as follows:

$$M_D[r,k] \overset{def}{=} -G\ln(1-P_D[r,k]) \quad (7)$$

For packet k traversing nodes in the ordered set $R_k$, $$M_D[k] = \sum_{r\in R_k} M_D[r,k] \quad (8)$$

A communication session consists of many packets, potentially traversing disparate routes. Each time a packet traverses any node in the network there is a chance that the session will draw the attention of an eavesdropper. Suppose the simple case where detection of any single packet implies that the eavesdropper will begin the process of reconstructing the session. Let the set of packets $k\epsilon S$ constitute the session. If the probability of detection is statistically independent for all nodes and all packets, then probability of detection for the packet is given by:

$$P_D[S] = 1 - \prod_{k\in S}(1-P_D[k]) \quad (9)$$

This equation can be seen to be in the same form as equation (5). Applying the same algebra as in equations (5) through (8), we arrive at:

$$M_D[S] = \sum_{k\in S} M_D[k] \quad (10)$$

Substituting for $M_D[k]$:

$$M_D[S] = \sum_{k\in S}\sum_{r\in R_k} M_D[r,k] \quad (11)$$

Consider the case where the presence of a SoI is confirmed. An eavesdropper is still tasked with reconstruction of the content of the session. Session reconstruction entails steps including packet capture (beyond mere identification that the packet was present), decryption (if applicable), decoding, interpretation of packet contents, and correlation with other packets in the session. For the case of a single packet, interception is defined to mean successful capture, decryption/decoding, and interpretation. As with detection, each node that a packet traverses provides a new risk that the packet will be intercepted. But, unlike detection, interception of a single packet in a session does not necessarily compromise the session as a whole—the eavesdropper cannot necessarily capture packets that do not traverse their node. The interception metric, $M_I$, captures the probability of intercept under the assumption that any eavesdropper who compromises a node, will generally intercept all packets that visit that same node.

Given a packet k relayed through node r, define $P_{I_0}[r,k]$ as the probability that an eavesdropper will intercept the packet's contents as it passes through node r, given that no prior packets have been intercepted at node r. The conditional interception metric $M_{I_0}[r,k]$ is then defined as:

$$M_{I_0}[r,k] \overset{def}{=} -G\ln(1-P_{I_0}[r,k]) \quad (12)$$

Let S be the set of all packets that constitute a session. Let $S_r$ be the subset of packets from set S that pass through node r. The unconditional interception metric at node r is the same for all packets in $S_r$ and is expressed as follows:

$$M_I[r,S_r] \overset{def}{=} \sum_{p\in S_r} M_{I_0}[r,p] \quad (13)$$

Let $R_k$ be the ordered list of nodes through which packet k passes. If probability of intercept at each node along R is statistically independent, then the packet's aggregate interception metric is the sum of the interception metrics at each node along the route:

$$M_I[k] = \sum_{r\in R_k} M_I[r,S_r] \quad (14)$$

No interception metric is defined for the aggregate session since it would only be meaningful if all packets in a session follow the same route. In that degenerate case, $M_I$ [k] would be the same for all $k\epsilon S$ and $M_I$ [S] would equal $M_I[k]$.

Let S denote the set of all packets that comprise a session. Suppose that a packet $k\in S$ traverses nodes in the ordered list $R_k$ to its destination. Further, let $S_r$ be the set of all session packets that pass through node r on the way to the destination. It is presumed that, if a potential eavesdropper at node r is able to intercept at least one packet, they will intercept all packets in $S_r$. Define the conditional probability that packet k is intercepted while traversing node r given that no other packets in the session have aided in the intercept as $P_{I_0}[r,k]$. If the probabilities $P_{I_0}[r,k]$ are statistically independent across packets in $S_r$, then the probability of intercept for packets in $S_r$ can be expressed as follows:

$$P_I[r,S_r] = 1 - \prod_{k\in S_r}(1-P_{I_0}[r,k]) \quad (15)$$

Rearranging terms and taking the logarithm of both sides yields:

$$\ln(1-P_I[r,S_r]) = \sum_{r\in R_k}\ln(1-P_{I_0}[r,S_r]) \quad (16)$$

By definition, probabilities fall within the range [0, 1]. Logarithms of probabilities therefore span the range (−∞, 0]. Negating both sides and scaling appropriately allows us to convert this measure into a nonnegative integer for ease of computation. This leads to the following definitions for the Interception Metric ($M_I$):

$$M_{I_0}[r,k] \overset{def}{=} -G\ln(1-P_I[r,k]) \quad (17)$$

$$M_I[r,S_r] \overset{def}{=} \sum_{p\in S_r} M_{I_0}[r,p] \quad (18)$$

If the interception probabilities across nodes are statistically independent then, as was derived for the detection metric, the aggregate Interception Metric can be expressed as follows:

$$M_I[k] = \sum_{r \in R_k} M_I[r, S_r] \tag{19}$$

Intercepting an entire session's packets requires having means of interception at a set of nodes through which all packets are routed. The simplest case when this can occur is when all packets in a session are sent along the same route: $S_r$=S for all choices of r along the route. For this simple case, interception of any single packet implies the interception of all packets:

$$S_r = S \forall\, r \to M_I[S] = M_I[k] \forall\, (k \in S) \tag{20}$$

Other cases require an assumption about the probability that an eavesdropper has joint access to multiple compromised nodes. Statistical independence breaks down at that point and the analysis requires specific knowledge of the joint probabilities among nodes.

While there are many similarities between the detection metric and the interception metric, the metrics can have disparate implications on routing choices. Consider the simple network topology shown in network diagram 10 of FIG. 1. The network includes a source node 20, destination node 30, and nodes in between, namely node 1 40, node 2 50, and node 3 60. Suppose 3000 packets are exchanged between source node 20 and destination node 30. As shown in FIG. 1, suppose the detection metric $M_D$ is a constant 5 (packet detection rate of %0.05) for all packets and for all nodes. The detection metric for the session is:

$$M_D[S] = \sum_{k \in S} \sum_{r \in R_k} M_D[r, k] = \sum_{p=1}^{3000} 5 = 15000.$$

This represents a 78% chance of detection.

Since all routes carry equal weight, the detection metric will be the same regardless of the routes chosen. But consider the interception metric. The conditional interception metric $M_{I_0}$ for all packets and all nodes is also a constant 5 (interception likelihood 0.05% for a single packet), but the (unconditional) interception metric increases rapidly as more session packets traverse the same node. If the source chooses to route all 3000 packets through Node 1, then the (unconditional) interception metric for each packet becomes:

$$M_I[r = 1, S_1] = \sum_{p=1}^{3000} 5 = 15000.$$

This represents a 78% chance that the entire session is intercepted. But, if the router chooses to split traffic evenly across all three intermediate nodes, the interception metric for each packet then becomes:

$$M_I[r = 1, S_1] = \sum_{p=1}^{3000} 5 = 5000$$

-continued $$M_I[r = 2, S_2] = \sum_{p=1001}^{2000} 5 = 5000$$

$$M_I[r = 3, S_3] = \sum_{p=2001}^{3000} 5 = 5000.$$

This represents a 39% chance of interception for each sub-session. Now, the probability that the session is captured in entirety is $(0.39)^3$=6%.

The detection metric captures the concern that the overall number of packet hops through potentially compromised routers is to be minimized. The interception metric extends to the concern that an eavesdropper at a single node can only capture and intercept those packets that visit their node. This means that the interception metric penalizes sessions that don't diversify their packet routes.

SoS metrics should be specified based on prior knowledge of network conditions. If little is known about which nodes are compromised or how effective the eavesdroppers may be, then specifying constant metrics for all packets (or even for all nodes) may be the best that can be done. More precise approximations can be made as more is known about the eavesdroppers present in the network. The below paragraphs describe methods for specifying SoS metrics when specific properties of an eavesdropper are known.

Suppose an eavesdropper is known to operate at node r, and it is believed that the eavesdropper is able to detect and intercept packets with 100% reliability. An eavesdropper of this type can be termed a "Perfect Listener" since they will never fail to capture traffic that visits their node. The SoS metrics for the Perfect Listener case are:

$$P_D[r, k] = 1 \to M_D[r, k] = \infty \tag{21}$$

$$P_{I_0}[r, k] = 1 \to M_{I_0}[r, k] = \infty \tag{22}$$

If the SoS metrics are used as routing costs, then the node is effectively disconnected from the network. If the SoS metrics are used to constrain routes, then any route that utilizes node r will fail the its constraints.

Now suppose that this Perfect Listener is only intermittently present at a given node (limited hours of operation, operator moves from site to site, etc.). If the listener is present during the session, then the probability of intercept is 100%. If the listener is not present, then the probability of intercept is 0%. Let the probability of a Perfect Listener's presence at node r be $P_{PL}$[r]. Then the probability of detection of a packet at node r is also $P_{PL}$[r]. But, the probability of packet detection is no longer statistically independent among packets in a session.

$$\forall\, k \in S_r : P_D[r, k] = P_{PL}[r] \tag{23}$$

In this case, equation (11) will not hold unless we capture the statistical dependence between packets in our specification of $M_D$ [r,k].

Given an initial condition where $\{k\} \cap S_r = \emptyset$ (i.e. k is not a member of $S_r$):

$$M_D[r, k] = \begin{cases} -G \ln(1 - P_{PL}[r]), & M_D[r, S_r] = 0 \\ 0, & \text{otherwise} \end{cases} \tag{24}$$

-continued $$M_{I_0}[r,k]=\begin{cases}-G\ln(1-P_{PL}[r]), & M_D[r,S_r]=0\\ 0, & \text{otherwise}\end{cases}\quad (25)$$

In other words, the detection metric is specified so that the estimated detection probability is increased for the first packet that visits a Perfect Listener, but not for subsequent packets. The same technique is applied for the conditional interception metric.

Most of the analysis up to this point has assumed some degree of statistical independence among packets. The value of modeling statistical dependence increases as more is known about the eavesdroppers in the network, however. The Perfect Listener case was a simple example of statistical dependence: the Perfect Listener has the same detection probability for one packet as it does for 1000 packets jointly. The discussion below considers a few more common cases where statistical independence can improve the security model.

Begin with the following definitions:

$$k\in\mathbb{N}\ (\text{packet index/identifier})\quad (26)$$

$$r\in\mathbb{N}\ (\text{network node index/identifier})\quad (27)$$

$$S\ni k\ (\text{set of packets that constitute a session})\quad (28)$$

$$S_r\subseteq S\ (\text{set of packets passing through node } r)\quad (29)$$

$$R\ni r\ (\text{set of nodes that constitute a network})\quad (30)$$

$$R_S\subseteq R\ (\text{nodes that relay at least one packet in } S)\quad (31)$$

$$R_k\subseteq R_S\ (\text{nodes through which packet } k \text{ passes})\quad (32)$$

Note that the algorithms discussed herein do not-utilize |R| (count of available nodes in the network) in the interest of ensuring scalability. It is assumed that |R| is large and expensive to measure. The following important set relationships exist for the definitions above:

$$\forall k\in\mathbb{N}: S\ni k\rightarrow R_k\neq\emptyset\quad (33)$$

$$\forall r\in\mathbb{N}: R_S\ni r\rightarrow S_r\neq\emptyset\quad (34)$$

$$\forall (r,k)\in(\mathbb{N},\mathbb{N}): S_r\ni k\rightarrow R_k\ni r\quad (35)$$

$$S=\bigcup\nolimits_{r\in R_S} S_r\quad (36)$$

$$R_S=\bigcup\nolimits_{k\in S} R_k\quad (37)$$

Using these properties, define the following discrete random variables:

$$E_r=\begin{cases}e_r, & \text{eavesdropper present at node } r\\ \overline{e_r}, & \text{otherwise}\end{cases}\quad (38)$$

$$D_{r,k}=\begin{cases}d_{r,k}, & \text{packet } k \text{ detected at node } r\\ \overline{d_{r,k}}, & \text{otherwise}\end{cases}\quad (39)$$

$$I_{r,k}=\begin{cases}i_{r,k}, & \text{packet } k \text{ intercepted at node } r\\ \overline{I_{l,k}}, & \text{otherwise}\end{cases}\quad (40)$$

These events have associated probabilities:

$$P_L[r]=Pr(e_r)\quad (41)$$

$$P_D[r,k\mid e_r]=Pr(d_{r,k}\mid e_r)\quad (42)$$

$$P_I[r,k\mid e_r]=\begin{cases}Pr\left(\bigcup\nolimits_{p\in S_r} i_{r,p}\mid e_r\right), & k\in S_r\\ 0, & \text{otherwise}\end{cases}\quad (43)$$

$$P_{I_0}[r,k\mid e_r]=Pr\left(i_{r,k}\,\middle|\,\bigcup\nolimits_{p\in S_r,\ p\neq k}\overline{I_{r,p}},e_r\right)\quad (44)$$

Then the probability of detection for a packet k traversing node r is given by:

$$P_D[k]=P_L[r]P_D[r,k\mid e_r]\quad (45)$$

Unfortunately, the joint probability that two packets ($k_1$, $k_2$) are detected at node r is not statistically independent:

$$P_D[r,k_1,k_2]=P_L[r]P_D[r,k_1\mid e_r]P_D[r,k_2\mid e_r]\neq P_D[r,k_1]P_D[r,k_2]\quad (46)$$

Using this knowledge, the following probability relations can be constructed for the set $S_r$:

$$P_D[r,S_r]=P_L[r]-P_L[r]\prod\nolimits_{k\in S_r}(1-P_D[r,k\mid e_r])\quad (47)$$

$$P_I[r,S_r]=P_L[r]-P_L[r]\prod\nolimits_{k\in S_r}(1-P_{I_0}[r,k\mid e_r])\quad (48)$$

These formulae reduce to the statistically independent case in equations (5) and (15) if $P_L[r]=1$. It is also observed that the Perfect Listener case is attained any time we set $P_D[r,k|e_r]=1$.

The case of an eavesdropper that, when present at a node, still does not capture packets with 100% effectiveness can be termed an "Imperfect Listener." This Imperfect Listener case is handled adequately by equations (5) and (15) when $P_L[r]=1$, but can become challenging when $0<P_L[r]<1$. Let's begin by deriving a Detection Metric from equation (47):

$$M_D[r,S_r]=-G\ln(1-P_D[r,S_r])\quad (49)$$

$$M_D[r,S_r]=-G\ln\left[1-P_L[r]+P_L[r]\prod\nolimits_{k\in S_r}(1-P_D[r,k\mid e_r])\right]\quad (50)$$

Now, the appropriate formulation of $M_D[r,k]$ is determined by observing the impact of adding packet k to the set $S_r$. Let $g:\Pi_{k\in S_r}(1-P_D[r,k|e_r])$ and suppose packet k is not initially a member of $S_r$:

$$M_D[r,k]=M_D[r,S_r\cup k]-M_D[r,S_r]\quad (51)$$

$$M_D[r,S_r]=-G\ln[1-P_L[r]+P_L[r]g]\quad (52)$$

$$M_D[r,S_r\cup k]=-G\ln[1-P_L[r]+P_L[r]g(1-P_D[r,k\mid e_r])]\quad (53)$$

$$M_D[r,k]=\quad (54)$$

$$-G\ln[1-P_L[r](1-g)+P_L[r]gP_D[r,k\mid e_r]]-G\ln[1-P_L[r](1-g)]$$

Two cases are considered: one where g≈1 and one where g≈0. Starting with the case where g≈1 (i.e. when $M_D[r, S_r]$ is small):

$$1 - P_L[r](1-g) \cong 1 \tag{55}$$

$$1 - P_L[r](1-g) + P_L[r]gp_D[r, k \mid e_r] \cong 1 - P_L[r]P_D[r, k \mid e_r] \tag{56}$$

These approximations reduce equation (54) when $M_D[r, S_r]$ is small:

$$M_D[r, k] \cong -G\ln[1 - P_L[r]P_D[r, k \mid e_r]] \tag{57}$$

Now, when g≈0 (or equivalently, when $M_D[r, S_r] \approx -G\ln[1-P_L[r]]$:

$$1 - P_L[r](1-g) \cong 1 - P_L[r] \tag{58}$$

$$1 - P_L[r](1-g) + P_L[r]gP_D[r, k \mid e_r] \cong 1 - P_L[r] \tag{59}$$

$$M_D[r, k] \cong 0 \text{ when } M_D[r, S_r] \approx -G\ln[1 - P_L[r]] \tag{60}$$

Taking the linear combination of equations (57) and (60) leaves the following approximation for the statistically dependent case:

$$T_L[r] := -G\ln[1 - P_L[r]] \tag{61}$$

$$M_D[r, k] \cong \begin{cases} -G\ln[1 - P_L[r]P_D[r, k \mid e_r]]\dfrac{T_L[r] - M_D[r, S_r]}{T_L[r]}, & M_D[r, S_r] < T_L[r] \\ 0, & \text{otherwise} \end{cases} \tag{62}$$

The conditional interception metric follows the same proof, resulting in the following approximation:

$$M_{I_0}[r, k] \cong \begin{cases} -G\ln[1 - P_L[r]P - I_0[r, k \mid e_r]]\,\dfrac{T_L[r] - M_I[r, S_r]}{T_L[r]}, & M_I[r, S_r] < T_L[r] \\ 0, & \text{otherwise} \end{cases} \tag{63}$$

For cases where multiple eavesdroppers have a chance of being present at the same node, detection metrics and conditional interception metrics will sum linearly since they are logarithms of probabilities. Combining many statistically dependent cases will tend to create potentially complex piecewise linear functions, however, and is not recommended unless high fidelity metrics are required. As an example of how to combine two different types of metrics at a single node, here is a problem statement:

"There exists an Imperfect Listener on the network that detects 50% of all traffic it observes. There is a 50% chance that this Imperfect Listener resides at node r=0. There is also a 10% chance that a Perfect Listener resides at node r=0."

The corresponding detection metric is derived as follows: Using Table 1 to find the 16-bit Detection Metrics for the Imperfect Listener ($P_L[r]P_D[k|e_r]$=25%→2877, $P_L[r]$=50%→$T_L[r]$=6931) and Perfect Listener ($P_{PL}[r]$=10%→1054), then plugging them into equations (24) and (62):

$$M_D[r=0, k] = \begin{cases} 2877 + 1054, & M_D[r, S_r] = 0 \\ 2877 \cdot \dfrac{6931 - M_D[r, S_r]}{6931}, & 0 < M_D[r, S_r] < 6931 \\ 0, & \text{otherwise} \end{cases} \tag{64}$$

Figure 2:
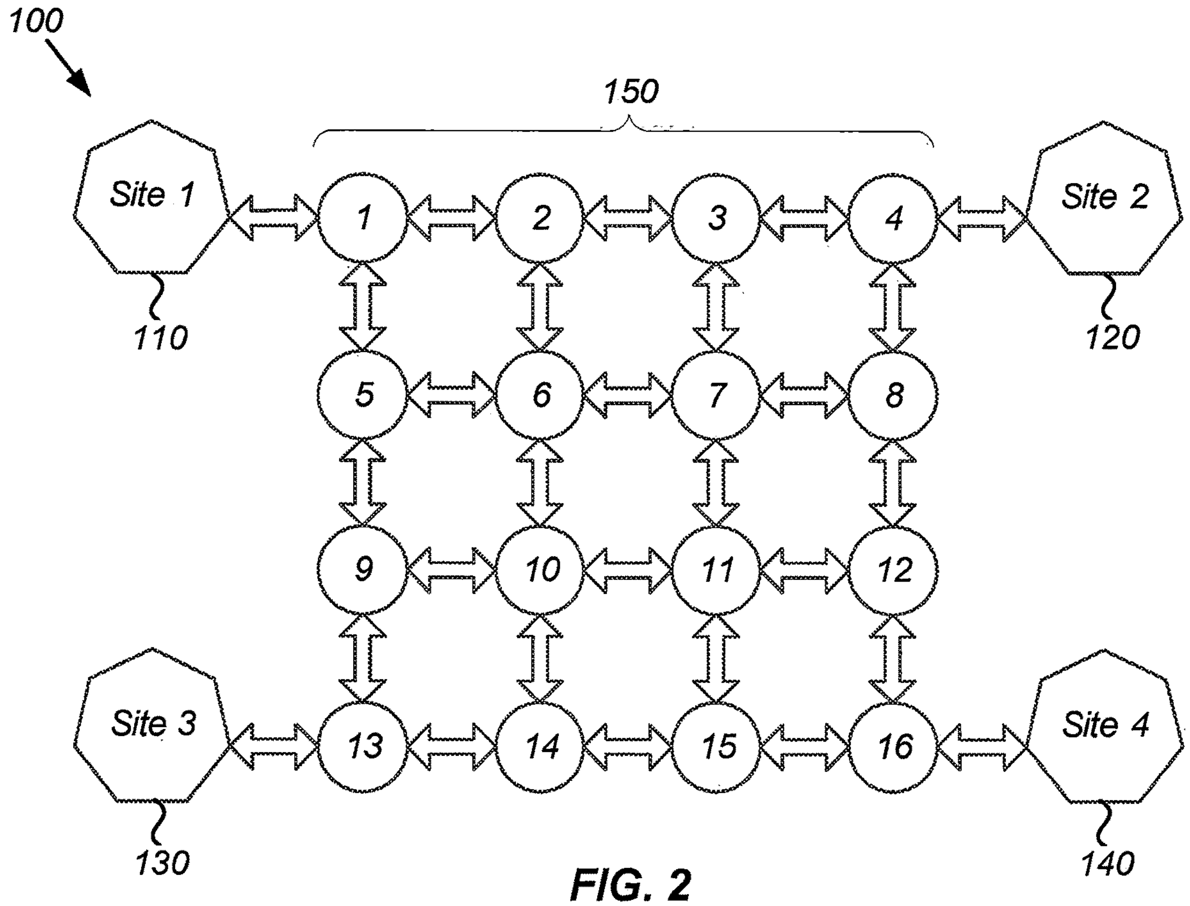
FIG. 2 shows a diagram illustrating a network of sites connected using a 16 node Manhattan grid Wide Area Network topology.

Tests of SoS-based route selection were performed using a virtual network of remote sites connected via a 16-router Manhattan grid Wide Area Network (WAN), such as that shown in FIG. 2. FIG. 2 shows a network 100 including four sites—site 1 110, site 2 120, site 3 130, and site 4 140—and sixteen nodes 1-16 150, which in this case are routers. It should be noted that the network may include any number of nodes and/or sites and in any particular established network configuration as would be recognized by a person having ordinary skill in the art. For example, the nodes 150 may be configured such that packets could additionally be sent to nodes diagonally from each other, such as from nodes 1 to 6, 6 to 3, etc.

In the example test configuration, the 16-router WAN executed the OSPF routing protocol, which allowed it to compute optimal routes in the presence of router dropouts (e.g. Denial of Service attacks). SDN controllers were deployed at the gateway from each site to the WAN, each with the ability to intercept outgoing traffic and tunnel it to a different site. SoS routing algorithms were implemented using the NOX controller and OpenVSwitch. The routing algorithms also labeled packets in such a way that point-to-relay-to-point routes could be planned and executed without cooperation of the WAN routers: each gateway would read the packet route and forward to the next site as appropriate. Routing protocols were employed at each gateway to minimize SoS metrics, with lowest cost (Dijkstra) routing employed as a control case. A network health packet was also employed to inform each site's controller as to which routes were degraded or denied due to DoS.

Routing via distance metric constrained by SoS thresholds yielded performance identical to Dijkstra routing alone, with the exception of forced session restart (and associated renegotiation of SSL session keys) on intervals where SoS thresholds were exceeded. In this manner the metrics did successfully prevent eavesdroppers residing on the WAN from collecting large numbers of packets as would be necessary to perform cryptanalysis and decode the session. SoS thresholds effectively penalize long-lifetime network sessions as being more vulnerable to compromise than short periodic sessions.

When routes were selected to minimize the detection metric, performance was comparable to Dijkstra since distance metric was specified to be a tiebreaker when SoS metrics were equal. In the presence of statistically dependent imperfect listeners, changes in selected route were minimal since the algorithms penalized introduction of the session to new routers. Routes chosen to minimize interception metric initially matched those of the Dijkstra algorithm, but evolved away from those routes over time. The interception metric penalized routers that had already observed many packets in a session, preferring to diversify routes to minimize the likelihood that any one eavesdropper would capture a large number of packets.

Figure 3:
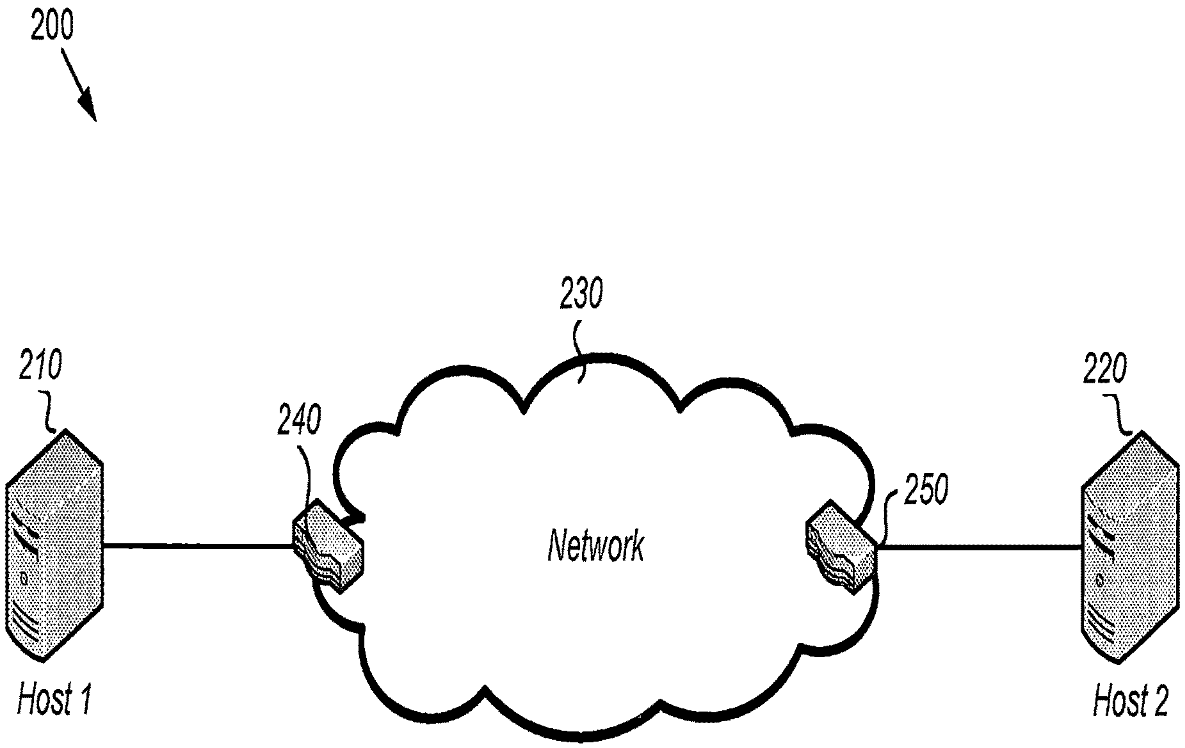
FIG. 3 shows a network diagram that may be used to perform the embodiments of the methods disclosed herein.

FIG. 3 shows a diagram of one embodiment of a system 200 that may be used to perform the embodiments of the methods disclosed herein. System 200 includes a first host 210, second host 220, network 230, and routers 240 and 250. As used herein, the term "host" may refer to a computer that hosts an application. Further, hosts may communicate with other hosts so that applications can interact, such as a web browser communicating with a web server. Packets may be sent from host 210 to host 220 via network 230, with routers 240 and 250 serving as gateways between network 230 and host 210 and 220, respectively.

Network 230 may include a plurality of communications devices therein, with each device being a node within the network. As used herein, a node may refer to any device that moves packets around, such as a switch, router, gateway, host, proxy, etc. The communications devices may comprise any device used within a communications network, such as a router, switch, gateway, firewall, proxy, etc., including a virtual device in a cloud or a device used only for commercial or government purposes. In some embodiments, the communications devices are configured to include the components shown in system 400 in FIG. 5 and may perform the processing as shown in diagram 300 shown in FIG. 4.

As an example, network 230 may have a configuration similar to nodes 150 shown and described with respect to FIG. 2. However, other network configurations are possible as recognized by a person having ordinary skill in the art. Network 230 may be configured to support various protocols including, but not limited to Spanning Tree Protocol (STP), Link Layer Discovery Protocol (LLDP), Open Shortest Path First (OSPF), or Border Gateway Protocol (BGP).

In some embodiments, network 230 may be implemented using a software defined network, where such a network includes one or more controllers. Although the SoS logic discussed herein may reside internally to devices such as first host 210 and router 240, in some embodiments the logic may reside in a network controller. In such embodiments, the controller may be configured to use the logic to route traffic through the network using the methods describe herein.

Figure 4:
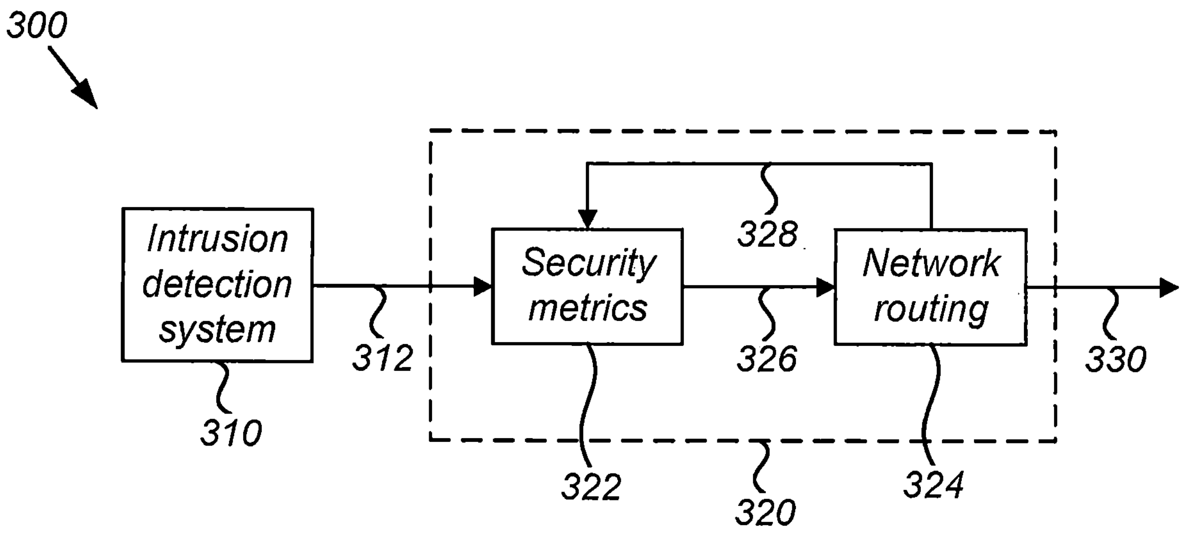
FIG. 4 shows a flow diagram illustrating an embodiment of the processing performed in accordance with the disclosed embodiments.

FIG. 4 shows a flow diagram 300 illustrating an embodiment of the processing performed in accordance with the disclosed embodiments. An intrusion detection system 310 provides input 312 to system 320. As an example, the inputs include a calculated packet detection metric $M_D$ and a conditional packet interception metric $M_{IO}$, as discussed herein. Additionally, the IDS may provide detection or interception metrics directly, or provide information that allows the system 320 to derive the metrics internally. For example, the IDS could provide a reputation score for a network device and the system could translate that score into metrics by estimating detection/interception probabilities, then using "$-G \ln(1-p)$". As another example, the IDS could provide the probabilities instead of requiring the system to infer them from reputation score.

System 320 receives input 312 at security metrics process 322, which uses input 312 to determine security metrics, such as the aggregate packet detection metric and aggregate packet interception metric as discussed herein.

The calculated security metrics are provided as input 326 into a network routing process 324, which determines the numerical characterization of the security of one or more routes of a communication network using input 326. If the numerical characterization meets a predetermined threshold, output 330 is provided to the system to route packets along one or more of the routes that meet the predetermined threshold. Such output 330 may comprise the selected route for a packet. Network routing process 324 may also provide input 328 to security metrics process 322. As an example, if the numerical characterization is not satisfactory, output 330 will not be provided, and updated security metrics may need to be calculated based upon the feedback from network routing process 324. As an example, an alert, alarm, or other notification may be provided to indicate that thresholds cannot be met for the current session, as discussed with reference to method 500.

In some embodiments, the routes may be automatically updated by network routing process 324 to minimize interception and/or detection risk. In such embodiments, the risks may be numerically assessed throughout a network session, allowing the system to mitigate changes in security posture or network throughput. Further, through the course of routing, the SoS algorithms can continually reassess risk. Actual risk can be assessed at any time by retrieving the current SoS metrics from security metrics process 322.

Figure 5:
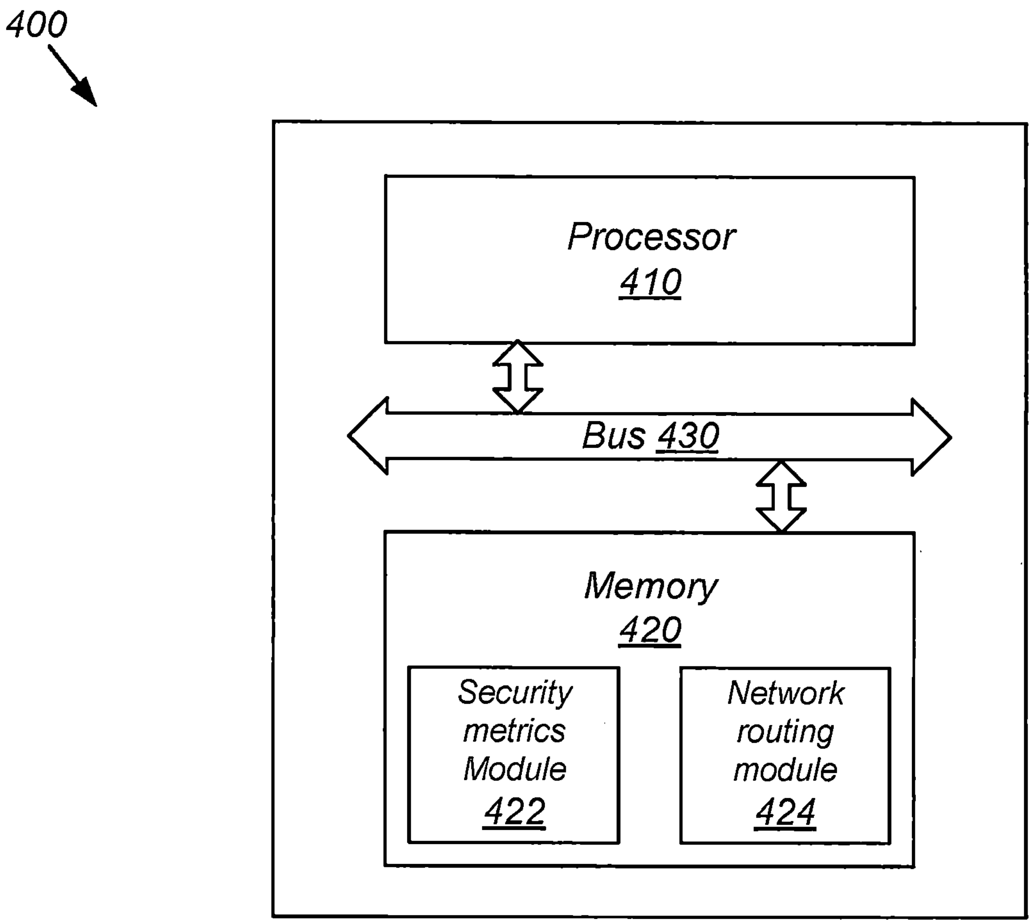
FIG. 5 shows a diagram of a system that may be used to perform the embodiments of the methods disclosed herein.

FIG. 5 shows a diagram of a system 400 that may be used to perform the embodiments of the methods disclosed herein. System 400 includes a processor 410 operatively connected to memory 420 via a bus 430. Memory 420 contains a security metrics module 422 and a network routing module 424 stored therein. Security metrics module 422 includes the computer-readable programming code for performing the security metrics calculations. Network routing module 424 includes the computer-readable programming code for performing the numerical characterization of the security of the routes of the communications network using the security metrics calculations. Processor 410 is configured to receive modules 422 and 424 from memory 420 via bus 430 to perform the respective security metrics calculations and numerical characterizations of the security of the routes. In some embodiments of system 400, processor 410 may be directly connected to memory 420 or may include memory 420 therein.

Figure 6:
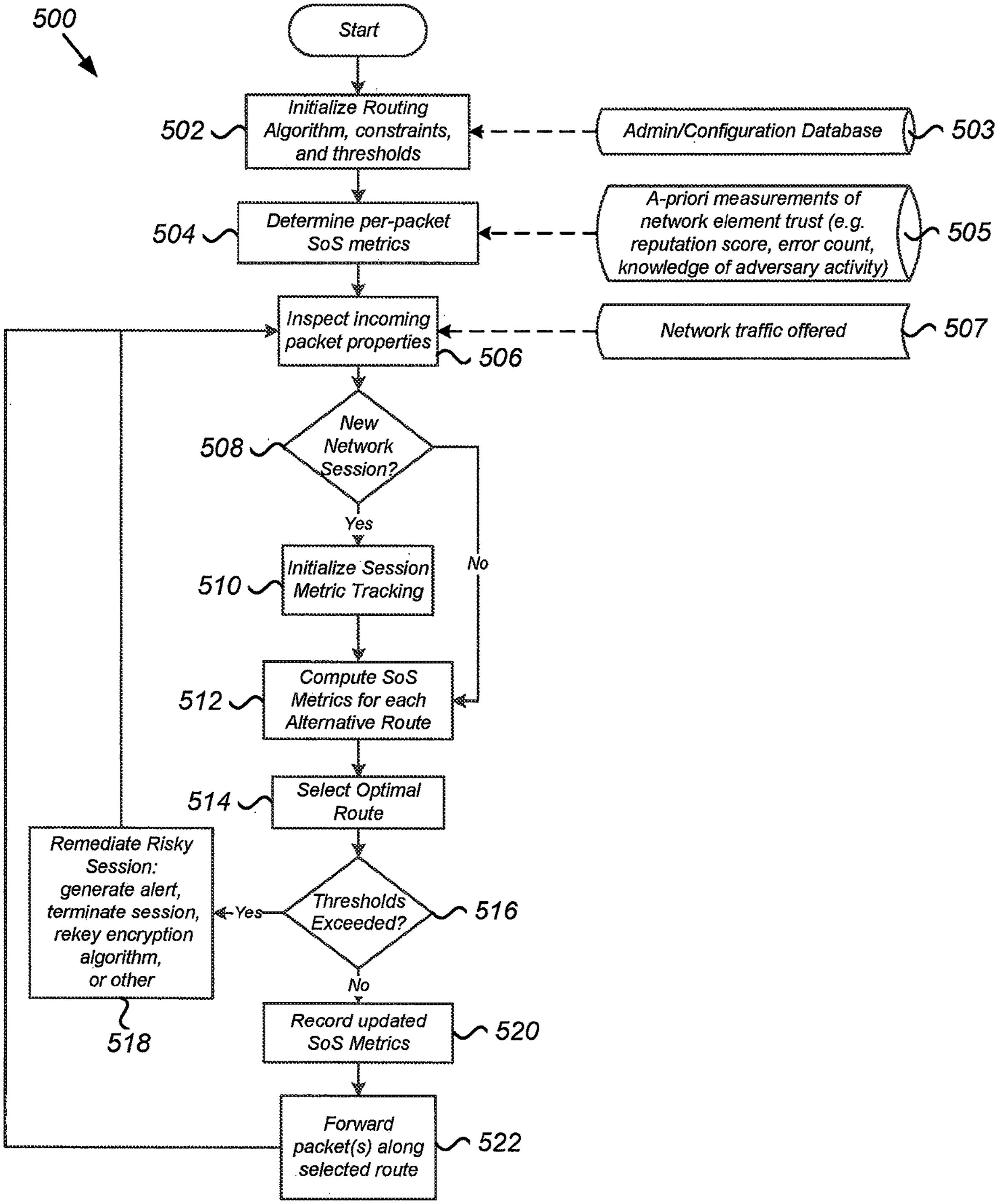
FIG. 6 shows a flowchart of an embodiment of a method in accordance with the disclosed embodiments.

FIG. 6 shows a flowchart of an embodiment of a method 500 in accordance with the disclosed embodiments. Method 500 may begin at step 502, which involves initializing a network routing algorithm, constraints, and thresholds. As an example, the network routing algorithm may be Dijkstra's algorithm, Bellman-Ford algorithm, or a shortest path with resource constraints algorithm. Step 502 may be performed using input from an administrative/configuration database 503. As an example, the database may be a file that is loaded at system startup. Further, a commercial tool such as MySQL or Splunk may be used to remotely store such a configuration database.

Step 504 involves determining per-packet SoS metrics, such as the packet detection metric and packet interception metrics discussed herein. In some embodiments, step 504 is performed using a-priori measurements of network element trust stored in a database 505. Examples of such information include reputation scores for specific devices within the network, error counts for specific devices within the network, and knowledge of adversary activity at devices within the network. However, any number/designation that rates one device as preferable over another device from a security perspective may also be used. For example, another measure that may be used is the make/model and firmware version, where the system could be configured to route its most sensitive traffic over nodes that have the latest security patches for their make/model.

Method 500 then proceeds to step 506, which involves inspecting incoming packet properties from network traffic received from a network traffic source 507. As an example, the network traffic source may be host 210 shown in FIG. 3 or any other device connected to a network. Step 508 involves a determination of whether or not the incoming traffic relates to a new network session. This determination may be made by comparing packet properties to those of known sessions-in-progress. If the packets do not match any known session, then the incoming packets may be construed to constitute a new session. If the packet relates to a new session, step 510 involves initializing session metric tracking and then flow proceeds to step 512. If a determination is made in step 508 that the packet does not relate to a new session, step 512 involves computing SoS metrics for each route in the communications network.

Step 514 then involves selecting an optimal route. As an example, the optimal route is the route that has the lowest probability of detection of the packet(s), the route that has the lowest probability of interception of the packet(s), the lowest combined probability of detection and interception, or a route chosen via conventional distance metric or Quality of Service routing. Each route to be evaluated may include metrics that must be strictly minimized and potentially different metrics that must simply fall above/below a threshold value. Further, the threshold may be based upon the type of data within the packet. As an example, a system may impose a predetermined threshold on delivery latency for video or audio streaming packets, or a system may require that detection or interception metric fall below a numeric threshold for the route to be acceptable.

Step 516 involves making a determination whether any thresholds, such as SoS or QoS thresholds, or any other threshold a network administrator imposes as part of step 502, have been exceeded. The fact that thresholds cannot be met is an "output" from the routing subsystem. The output (notification) can be acted upon in any manner the administrator chooses. As an example, the routing subsystem may notify the system that the packets cannot be delivered as requested—either no valid network route exists or some threshold cannot be met. In response to the notification, the system may choose to: 1) tell the routing system to "send the packets anyway"—effectively overriding the threshold—and log the event; 2) allow the packets to be dropped—effectively terminating the session; 3) reset the software application that is making the session, causing the session to be renegotiated; 4) destroy an encapsulation tunnel and open a new one (this is one way to achieve "rekey encryption algorithm"); or 5) any other action the administrator desires the system to perform. For example, step 518 may involve remediating the risky session, generating an alert, terminating the session, re-keying an encryption algorithm, or other action, with flow then proceeding back to step 506.

If thresholds have not been exceeded, step 520 involves recording updated SoS metrics. Step 522 then involves forwarding the packet(s) along the selected route, with flow then proceeding back to step 506.

Figure 7:
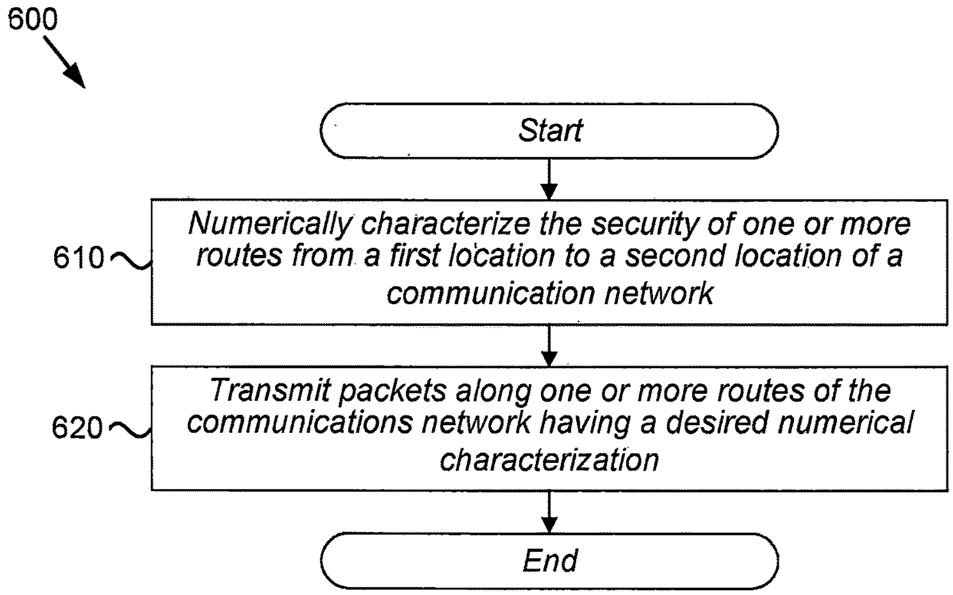
FIG. 7 shows a flowchart of another embodiment of a method in accordance with the disclosed embodiments.

FIG. 7 shows a flowchart of another embodiment of a method 600 in accordance with the disclosed embodiments. As an example, method 600 may be performed by systems 200 and 400 as shown in FIGS. 3 and 5. Also, while FIG. 7 shows one embodiment of method 600 to include steps 610-620, other embodiments of method 600 may contain fewer or more steps. Further, while in some embodiments the steps of method 600 may be performed as shown in FIG. 7, in other embodiments the steps may be performed in a different order, or certain steps may occur simultaneously with one or more other steps. Additionally, some or all of the steps of method 600 may be performed by processor 410 embedded within system 400, by receiver host 1 210, host 2 220, routers 240 and 250, or by other processing means operatively connected to a communications network.

Method 600 may begin with step 610, which involves numerically characterizing the security of each of more than one routes from a first location to a second location in a communications network. In some embodiments, step 610 involves numerically characterizing the security of each communication device at each node along the plurality of routes from the first location to the second location in the communications network. In some embodiments, step 610 is performed using information received from a system outside of the communications network, such as from an intrusion detection system as shown in FIG. 4.

Figure 8:
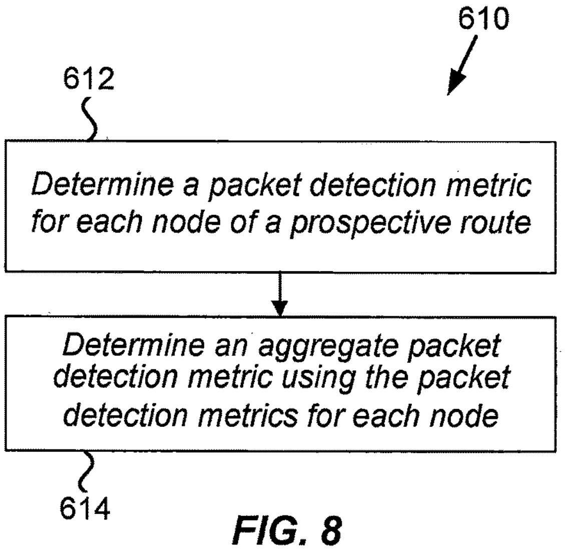
FIG. 8 shows a flowchart of an embodiment of a step for numerically characterizing the security of one or more routes of a communications network in accordance with the disclosed embodiments.
Figure 9:
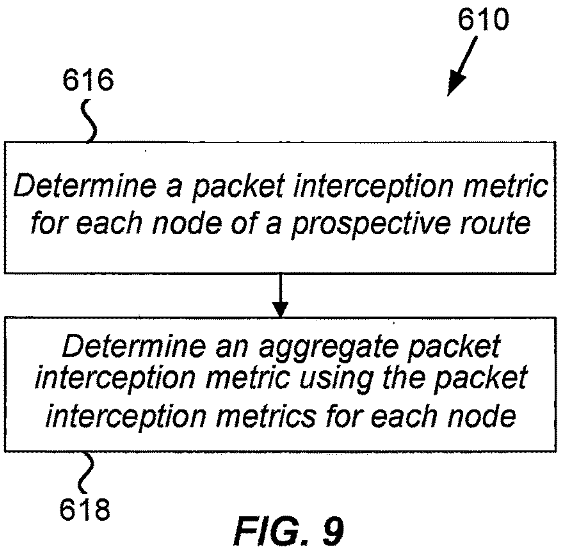
FIG. 9 shows a flowchart of another embodiment of a step for numerically characterizing the security of one or more routes of a communications network in accordance with the disclosed embodiments.

FIGS. 8 and 9 show flowcharts of embodiments of step 610 where the route contains one or more nodes. Although FIGS. 8 and 9 show different embodiments of step 610, some embodiments of step 610 include each of steps 612, 614, 616, and 618. Referring to FIG. 8, step 612 involves determining a packet detection metric for each node of a prospective route. In some embodiments, the packet detection metric is determined according to the equation $M_D[r,k] \stackrel{\text{def}}{=} -G\ \ln(1-P_D[r,k])$, where $0 \le M_D[r,k] < \infty$, where $M_D[r,k]$ is the packet detection metric, k is a packet, r is a node, $P_D[r,k]$ is a probability that the packet will be identified as a member of a session of interest, and G is a gain factor, wherein the aggregate packet detection metric $M_D[k]$ is constructed as a mathematical function of $M_D[r,k]$ where $r \in R_k$ and $R_k$ is an ordered list of nodes through which packet k passes.

Step 614 involves determining an aggregate packet detection metric as a mathematical function of the determined packet detection metrics for each node along the prospective route. As an example, the aggregate packet detection metric is found by summing the individual determined packet detection metrics for each node along the prospective route. However, other mathematical operations may be used to determine the aggregate packet detection metric, as would be recognized by a person having ordinary skill in the art.

Referring to FIG. 9, step 616 involves determining a packet interception metric for each node of a prospective route. In some embodiments, the packet interception metric is determined based upon a conditional packet interception probability, wherein the conditional packet interception probability is the probability that a packet will be intercepted at a node given that no prior packets in a session have been intercepted.

In some embodiments, the packet interception metric is determined according to the equation $M_I[r, S_r] \stackrel{\text{def}}{=} \Sigma_{k \in S_r} M_{I_0}[r,k]$, where $S_r$ is a subset of packets k from a set S that pass through a node r, where Sis a set of all packets that constitute a session, where $M_{I_0}[r,k]$ is a conditional packet interception metric that summarizes the conditional packet interception probability. The conditional packet interception metric may be determined according to the equation $M_{I_0}[r,k] \stackrel{\text{def}}{=} -G\ \ln(1-P_{I_0}[r,k])$, where $P_{I_0}[r,k]$ is a probability that the packet will be intercepted as it passes through node r and G is a gain factor.

Step 618 involves determining an aggregate packet interception metric as a mathematical function of the determined packet interception metrics for each node along the prospective route. In some embodiments, the aggregate packet interception metric is determined according to the equation $M_I[k] = \Sigma_{r \in R_k} M_I[r,S_r]$, where $R_k$ is an ordered list of nodes through which packet k passes. However, other mathematical operations may be used to determine the aggregate packet interception metric, as would be recognized by a person having ordinary skill in the art.

Referring back to FIG. 7, method 600 may then proceed to step 620, which involves transmitting at least one packet from the first location to the second location along one or more routes of the communications network having a desired numerical characterization. As an example, step 620 is performed by a communications device such as router 240 shown in FIG. 3.

Method 600 may be implemented as a series of modules, either functioning alone or in concert, with physical electronic and computer hardware devices. Method 600 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the disclosed embodiments are possible in light of the above description. Within the scope of the appended claims, the embodiments of the systems and methods described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:

numerically characterizing the security of each of more than one routes from a first location to a second location in a communications network; and transmitting at least one packet from the first location to the second location along one or more routes of the communications network having a desired numerical characterization;

wherein each route comprises one or more nodes, wherein the step of numerically characterizing the security of each of more than one routes from a first location to a second location in a communications network comprises:

determining a packet detection metric for each node of a prospective route; and determining an aggregate packet detection metric as a mathematical function of the determined packet detection metrics for each node along the prospective route.

2. The method of claim 1, wherein the packet detection metric is determined according to the equation $M_D[r,k] \stackrel{def}{=} -G \ln(1-P_D[r,k])$, where $0 \leq M_D[r,k] < \infty$, where $M_D[r,k]$ is the packet detection metric, k is a packet, r is a node, $P_D[r,k]$ is a probability that the packet will be identified as a member of a session of interest, and G is a gain factor, wherein the aggregate packet detection metric $M_D[k]$ is constructed as a mathematical function of $M_D[r,k]$ where $r \in R_k$ and $R_k$ is an ordered list of nodes through which packet k passes.

3. A method comprising the steps of:

numerically characterizing the security of each of more than one routes from a first location to a second location in a communications network; and transmitting at least one packet from the first location to the second location along one or more routes of the communications network having a desired numerical characterization, wherein each route comprises one or more nodes, wherein the step of numerically characterizing the security of each of more than one routes from a first location to a second location in a communications network comprises:

determining a packet interception metric for each node of a prospective route; and determining an aggregate packet interception metric as a mathematical function of the determined packet interception metrics for each node along the prospective route.

4. The method of claim 3, wherein the packet interception metric is determined based upon a conditional packet interception probability, wherein the conditional packet interception probability is the probability that a packet will be intercepted at a node given that no prior packets in a session have been intercepted.

5. The method of claim 4, wherein the packet interception metric is determined according to the equation $M_I[r,S_r] \stackrel{def}{=} \Sigma_{k \in S_r} M_{I_0}[r,k]$, where $S_r$ is a subset of packets k from a set S that pass through a node r, whet of all packets that constitute a session, where $M_{I_0}[r,k]$ is a conditional packet interception metric that summarizes the conditional packet interception probability.

6. The method of claim 5, wherein the conditional packet interception metric is determined according to the equation $M_{I_0}[r,k] \stackrel{def}{=} -G \ln(1-P_{I_0}[r,k])$, where $P_{I_0}[r,k]$ is a probability that the packet will be intercepted as it passes through node r and G is a gain factor.

7. The method of claim 5, wherein the aggregate packet interception metric is determined according to the equation $M_I[k]=\Sigma_{r \in R_k} M_I[r,S_r]$, where $R_k$ is an ordered list of nodes through which packet k passes.

8. The method of claim 1, wherein the step of numerically characterizing the security of each of more than one routes from a first location to a second location in a communications network comprises numerically characterizing the security of each communication device at each node along the plurality of routes from the first location to the second location in the communications network, wherein the step of numerically characterizing the security of each communications device along the plurality of routes from the first location to the second location in the communications network is performed using information received from a system outside of the communications network.

9. The method of claim 1, wherein the desired numerical characterization is the lowest probability of detection of the packet.

10. The method of claim 1, wherein the desired numerical characterization is the lowest probability of interception of the packet.

11. The method of claim 1, wherein the desired numerical characterization is the numerical characterization that is above a predetermined threshold.

12. The method of claim 11, wherein the predetermined threshold is determined based upon the type of data within the packet.

13. A method comprising the steps of:

transmitting a plurality of packets from a first location within a communications network to a second location within the communications network, the communications network comprising a plurality of nodes each configured to receive the packets and forward the packets to one or more other nodes, wherein the packets are transmitted using one or more routes within the communications network, wherein the routes are selected based upon a desired numerical characterization of the security of the route, wherein each route comprises one or more nodes, wherein the step of numerically characterizing the security of each of more than one routes from a first location to a second location in a communications network comprises:

determining a packet detection metric for each node of a prospective route;

determining an aggregate packet detection metric as a mathematical function of the determined packet detection metrics for each node along the prospective route;

determining a packet interception metric for each node of a prospective route; and determining an aggregate packet interception metric as a mathematical function of the determined packet interception metrics for each node along the prospective route.

14. The method of claim 13, wherein the desired numerical characterization is the lowest combined aggregate packet detection metric and an aggregate packet interception metric.

* * * * *